(No Model.)

E. WESTON.
ELECTRIC INDICATOR.

No. 381,736. Patented Apr. 24, 1888.

WITNESSES.
Jennie P. Ashley.
Henry J. Thebeath

INVENTOR.
Edward Weston
By his Attorneys
Pope Edgcomb & Terry

UNITED STATES PATENT OFFICE.

EDWARD WESTON, OF NEWARK, NEW JERSEY.

ELECTRIC INDICATOR.

SPECIFICATION forming part of Letters Patent No. 381,736, dated April 24, 1888.

Application filed August 13, 1887. Serial No. 246,838. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electric Indicators, of which the following is a specification, reference being had to the drawings accompanying and forming part of the same.

My invention relates especially to that class of instruments for electrical measurement usually called "voltmeters" and "ammeters," which are employed to determine electro-motive force or current strength when relatively large quantities of electricity are required to be dealt with, as in electric lighting or the electric transmission of power.

The invention consists, chiefly, in an improved method of suspending the movable magnet, the oscillations of which are used to indicate variations of current.

Figure 1:
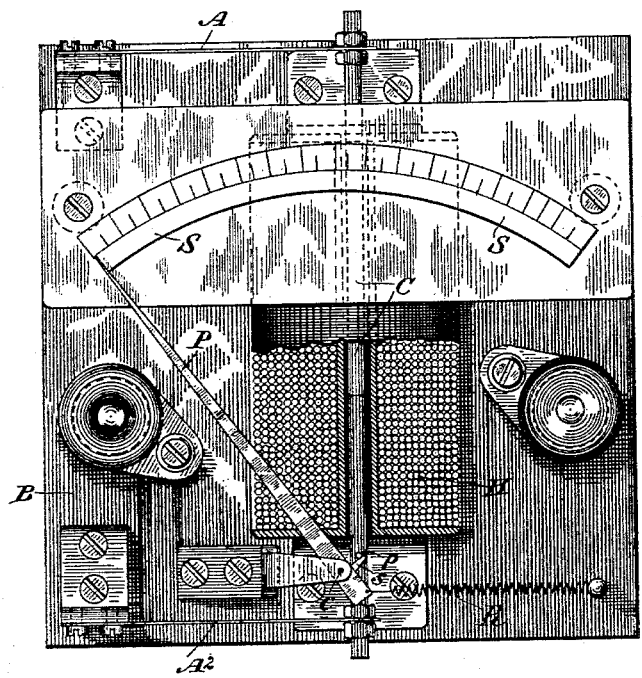
Figure 2:
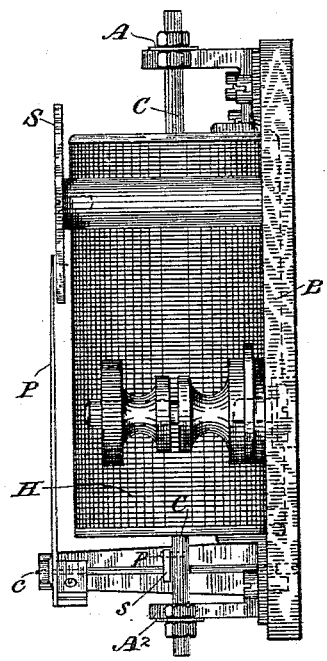
Figure 3:
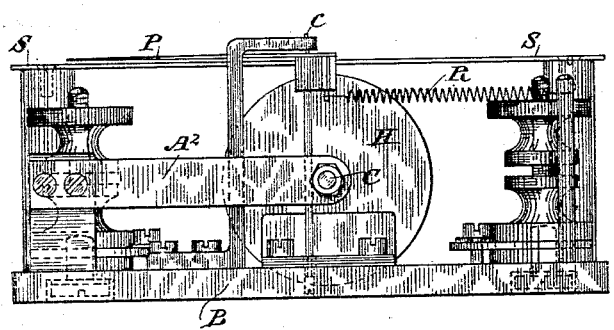

In the accompanying drawings, forming part of this specification, a voltmeter has been selected for illustration, Figure 1 being a plan view from above, partly in section; Fig. 2, a side view, and Fig. 3 an end view.

The same letters of reference are used to designate like parts in each figure.

B is a base of hard rubber, or other suitable material; H, a solenoid or hollow coil of copper or other wire; C, a core, the greater portion of the length of which is of soft iron, while the shorter portion is of brass or other non-magnetic material. This core is designed to pass freely through the solenoid H. The core C is supported at each end by attaching it to the free ends of the flat springs A and $A^2$.

S is a scale-plate or dial mounted in a proper position above the solenoid H.

P is a pointer or index pivoted at $c$, its arbor being provided with a short arm, $s$, engaging with a pin, $p$, on the core C.

R is a spiral spring so attached to pointer P that by its tension it will cause the short arm $s$ to bear constantly against the pin $p$.

The operation of the instrument is as follows: When no current is traversing the solenoid H, the springs A and $A^2$ hold the core C in such position in respect to the pointer P as to cause the latter to point to the extreme left or zero of the scale S. The passage of a current through the solenoid H causes the iron portion of the core C to be drawn farther into the solenoid with a force proportional to the strength of the current. The movement of the core is transmitted to the pointer, which moves to a greater or less distance across the scale, according to the strength of the current passing.

Any known equivalent may be used in lieu of the pin $p$ and arm $s$ for transmitting the movement of the core to the pointer—as, for example, a pinion and toothed segment.

The peculiar manner in which the core is supported upon the two springs A and $A^2$ avoids any friction in its movement, while it is always held in a position coincident with the axis of the solenoid.

I do not limit myself to the employment of flat springs for suspending the core, as it is obvious that coiled or other forms of springs might be used in such a manner as to prevent the lateral oscillation of the core, while permitting its free longitudinal movement.

My invention is not limited to the particular construction of indicator shown and described herein, my method of suspending the core upon two springs being adaptable to other forms of indicators. It might be convenient in some forms of construction to attach the springs to the core at intermediate points of its length rather than at its extremities.

I claim as my invention—

1. In an electric indicator, the combination of a solenoid or hollow coil with a core having its longitudinal axis coincident with the axis of the solenoid, and springs for supporting said core, which are flexible in one direction, so as to permit the free longitudinal movement of the core, and rigid in other directions, to prevent any lateral movement of the same.

2. In an electric indicator, a core or armature supported upon the ends of two flat springs and free to move longitudinally, but not laterally, in combination with an index or pointer and a retracting-spring.

3. In an electric indicator, the combination of a solenoid with an axial core freely suspended therein and supported by two springs at different points of its length, a pointer or index, and the arm $s$, pin $p$, and spring R, for communicating the motion of the core to the pointer.

In testimony whereof I have hereunto subscribed my name this 12th day of August, A. D. 1887.

EDWARD WESTON.

Witnesses:
DANL. W. EDGECOMB,
CHARLES A. TERRY.